Figure 1:
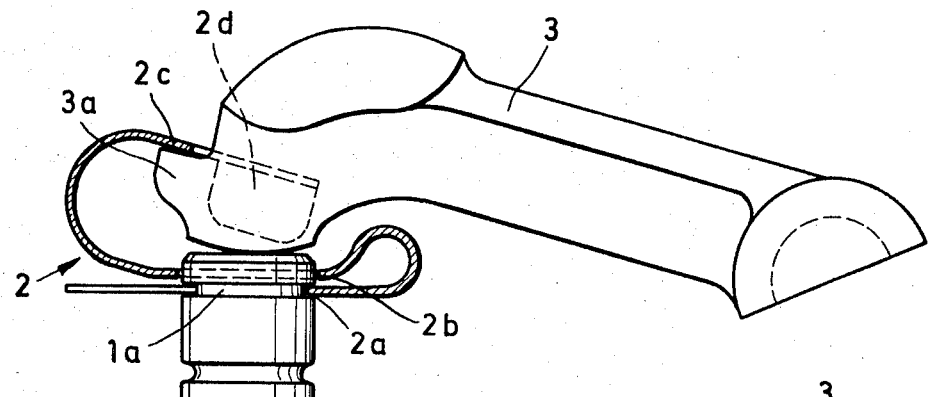

United States Patent

Renger et al.

[15] 3,656,461
[45] Apr. 18, 1972

[54] SAFETY MECHANISM FOR VALVE ROCKERS

[72] Inventors: Udo Renger, 318 Wolfsburg, Bonhoefferstrabe; Peter Thauer, 3181 Neuhaus, Am Seeterich 9, both of Germany

[22] Filed: June 15, 1970

[21] Appl. No.: 45,967

[30] Foreign Application Priority Data

Feb. 26, 1970 Germany .................. P 20 08 944.5

[52] U.S. Cl. .............. 123/90.42, 123/90.47, 123/90.67, 123/188 AF
[51] Int. Cl. .................................. F01l 1/18, F01l 3/10
[58] Field of Search ............ 123/90.42, 90.47, 90.67, 90.25, 123/188 VA, 188 AF

[56] References Cited

UNITED STATES PATENTS

| | | | |
|---|---|---|---|
| 1,541,081 | 6/1925 | Vareille | 123/90.25 |
| 2,757,653 | 8/1956 | Links et al. | 123/90.42 X |
| 2,824,555 | 2/1958 | Sampietro | 123/90.42 X |
| 2,831,470 | 4/1958 | Lorscheidt | 123/90.67 X |
| 3,002,507 | 10/1961 | Bensinger et al. | 123/90.67 X |
| 3,195,528 | 7/1965 | Franklin | 123/90.44 X |
| 3,217,699 | 11/1965 | Dolza | 123/188 VA X |

Primary Examiner—Al Lawrence Smith
Attorney—Watson, Cole, Grindle & Watson

[57] ABSTRACT

Safety mechanism for an individually fulcrummed rocking lever of a valve control, mounted at one end on a ball, especially for internal combustion engines, wherein a holder is mounted on the upper end of the valve shaft in such a manner as to axially lock and to prevent the lateral swinging of the rocking lever relative to the valve shaft.

10 Claims, 7 Drawing Figures

SAFETY MECHANISM FOR VALVE ROCKERS

This invention relates to a safety mechanism for individually fulcrummed valve rockers of valve controls, especially for internal combustion engines which safety mechanism prevents a lateral swinging away of the valve rocker without precluding the rotatability of the valve.

In known constructions, the valves of a combustion engine are operated by means of valve rockers by a cam shaft provided on top, and have a mounting which is not accomplished on a shaft but, for example, on ball-like mountings, whereby it is necessary to secure the valve rockers against a lateral swinging, since such a ball bearing has no definite axis of rotation. This has been accomplished, for example, by lateral projections on the valve rockers which encircle the valve shaft. However, such structure is unfavorable and also expensive from manufacturing standpoint.

It has been also known to place caps on the ends of the valve shafts which will hold the valve rockers by means of lateral projections. However this structure has the drawback that the desired revolution of the valve cannot be produced by means of the ratios of movement between the lever and valve shaft, but that special valve turning devices must be used. Furthermore, caps made for example of plastic have been known which make possible the revolving of the valves by the fact that the end of the valve shaft projects through a central bore in the cap and thus a direct contact between the valve shaft and the valve rocker exists. But all these devices mentioned have the drawback that a lifting off between the valve shaft and the valve rocker and connected with that, a lateral swinging, for example in the case of a sticking of the valves or a fluttering of the valves, will not be prevented. These disadvantages cannot be avoided completely either by well known additional constructional elements, such as for example, springs.

An object of the present invention is therefore to eliminate these disadvantages and to increase operational safety. According to the invention, the solution to this problem is characterized by the fact that a holder mounted safely on the end of the valve shaft or an adjoining construction element against shifting movements in the direction of the axis of the valve shaft overlaps with an upper area and is free of play as to a projection on the valve rocker and, furthermore, has two bent up guide surfaces guiding the valve rocker laterally, as a result of which, a positive locking connection between the valve and the valve rocker will be established in an axial and lateral direction. The holder may be in the form of a claw with two lateral guide surfaces in its upper area and this claw overlaps, without play, a projection arranged in front on the valve rocker, as a result of which a positive locking connection between the valve shaft and the valve rocker will be established continuously in an axial direction. The holder can be made of an elastic or nonelastic solid molded article, for example of plastic, instead of from spring steel sheet. In the case of the nonelastic holder however, an additional attaching element is required in the shape of a sheetmetal clamp.

Another design of the invention is characterized in that both the eye-like area encircling the projection as the two guide surfaces, are obtained by an upward bending from a central area of the holder running transversely to the axis of the valve shaft, and in that the central area at its outside edge carries three flaps displaced by 90° in relation to one another. The middle flap opposes the eye-like area diametrically, and furthermore is bent away in an opposite direction to the latter, and the two opposing flaps are bent once more toward each other and engage with an annular groove in the end of the valve shaft or in the adjoining constructional element. The middle area of the three flaps and the eye-like area form stops preventing the lateral escape movement of the flaps from the annular groove.

It is therefore a further object of the invention, concerning the design of the safety mechanism, to produce the holder from a metal sheet by simple cutting and bending methods whereby essentially one merely has to carry out bends from out of the plane of the central area of the holder in directions which are opposite one another.

Advantageously, the various parts have been made use of for mutual protection against undesirable movement, that is, the eye-like area of the holder together with a projection encircled by it, as well as with two flaps on the holder engaging with the annular groove brings about the protection against any lifting off of the valve rocker from the end of the valve shaft. Furthermore, the eye-like area together with the middle one of the three flaps will prevent transverse movements of the holder which could lead to a sliding out of the two bent flaps from the annular groove and these two flaps represent the protection against transverse movements in directions perpendicular thereto.

In case the making of the annular groove on the end of the valve shaft should offer difficulties, for example, for reasons of strength during operation, a continued development of the invention has proven itself advantageous which is characterized by the fact that the adjoining construction element is a valve disk provided with an annular groove, which serves for the mounting of the holder. Constructionally, the annular groove can be formed by the fact that the valve disk consists of two parts following each other in an axial direction and which enclose the annular groove between them.

Figure 2:
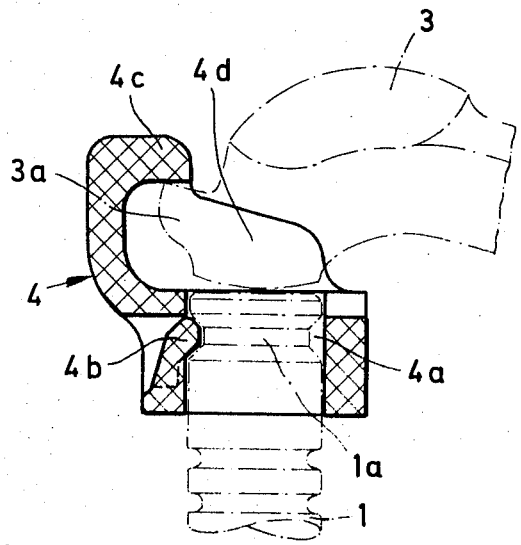
Figure 3:
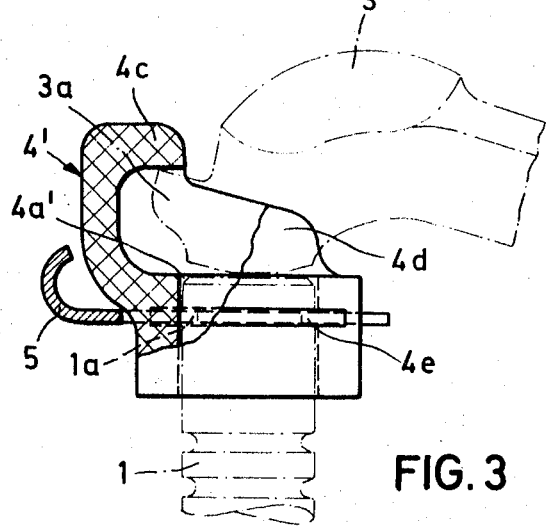
Figure 5:
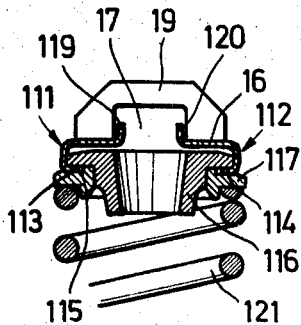
Figure 4:
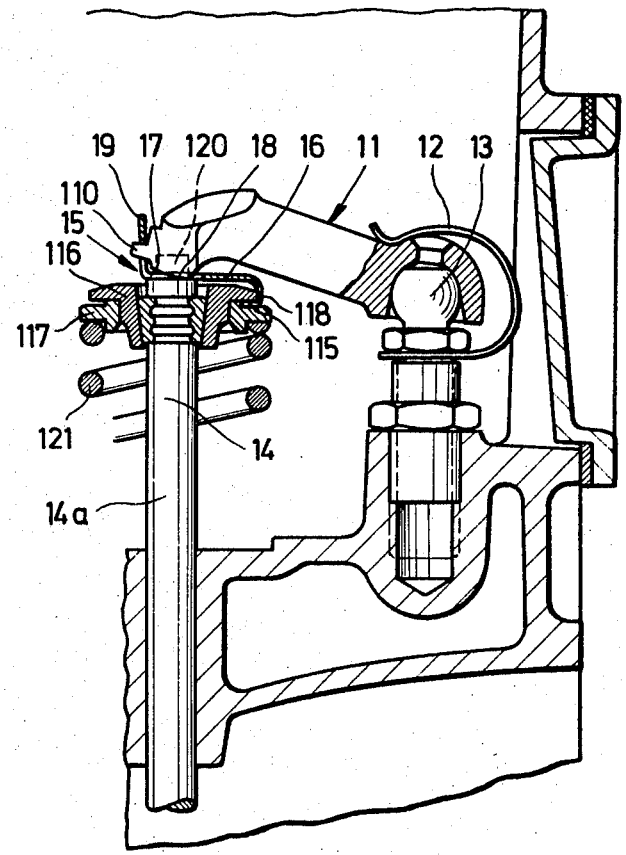
Figure 6:
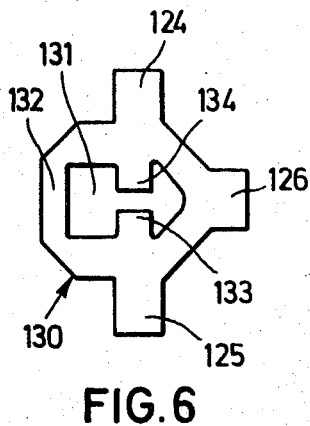
Figure 7:
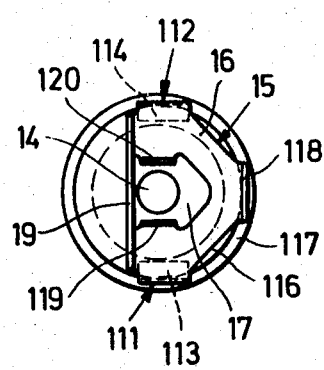

Further objects of the invention will be apparent from the following description when considered in connection with the accompanying drawings in which;

FIG. 1 is a side view partly in section of a safety mechanism according to the invention with a holder made of spring steel connected on the valve shaft, FIGS. 2 and 3 are sectional views of a safety mechanism with a holder as an elastic or nonelastic solid molded article with the valve shaft and valve rocker indicated by dash-dot lines, FIG. 4 is a vertical section of a modified holder and partial engine structure, FIG. 5 is a vertical section of the holder of FIG. 4, FIG. 6 is a plan view of the holder as stamped from sheetmetal, and FIG. 7 is a top plan view of the holder and valve shaft.

Referring to FIG. 1, the upper end 1 of the valve shaft is provided with an additional annular groove 1a for the reception and axial guidance of the holder 2, which is held with its lower part by means of a receiving bore 2a in said groove 1a. A slit-like recess makes possible the mounting by insertion from the side. A bore 2b serves at the same time as a radial guide and the upper area of the holder 2 is provided with a claw 2c overlapping or over reaching a projection 3a on the rocker valve arm 3, as a result of which a continuous and positive locking contact is provided between the valve shaft 1 and the rocker valve arm 3. As a result of two guide surfaces or tabs 2d which encompass the valve rocker arm 3 and which are attached to the claw 2c, a lateral swinging out of the rocker will be prevented.

Further, the holder 4 developed as an elastic solidly moulded article, is slipped onto end 1 of the valve shaft through a cylindrical bore 4a, whereby an arch-shaped bead 4b present in the area of this bore 4a, and is inserted into the annular groove 1a, FIG. 2. The nonelastic solid molded part 4', FIG. 3, is likewise secured there by means of a cylindrical bore 4a' onto end 1 of the valve shaft. The attachment however is accomplished by means of an additional element, preferably a clamp 5 of sheetmetal which, after the holder 4' is put in place, is inserted into laterally applied slits 4e, FIG. 3.

Both solid molded articles encircle the valve rocker 3 in the same manner with two parallel lateral guide surfaces or tabs 4d. Thus a positive locking contact between the valve shaft 1 and the valve rocker 3 is always established in the same manner by means of the claw 4c which overlaps projection 3a of the valve rocker arm 3 and a lateral swinging out of the valve rocker arm 3 will be prevented.

The axial and radial guidance of the holder in relation to the valve shaft can also be accomplished on an adjoining constructional element which carries out the lifting movement of the valve, for example, the valve disk or valve spring cotters.

FIGS. 4 to 7 show structure of the invention by way of example wherein a bipartite valve disk is used in cooperation with the valve shaft annular groove. While FIGS. 4 and 5 show the holder in its state where it is built into the machine, FIGS. 6 and 7 serve for the illustration of two phases of the production method for the holder. FIGS. 4 and 5 are two lateral sections while FIGS. 6 and 7 are each top views.

In FIG. 4 it can be seen that the valve rocker 11 is held in the area of its right-hand end in the figure by means of a spring 12 on a ball bearing 13. Its left end in this figure rests likewise under the action of spring 12, on the end of the valve shaft 14. Both in order to secure this condition as well as for securing the valve rocker 11 against lateral movements, the holder made of spring steel sheet and generally designated by 15 has been provided which in its central area 16, running at least approximately transversely to the axis 14a of the valve shaft 14, has the recess 17. This recess ensures that the valve rocker 11, with its left end in FIG. 4, rests directly on the front surface of the valve shaft 14. This area of the valve rocker 11 has been designated by 18.

Recess 17 extends into the approximately eye-like area 19 of the holder which has been bent up from the plane of the central area 16 of said holder and with which area the holder 15 encircles projection 110 with play at the left end of the valve rocker 11, FIG. 4. Since holder 15 furthermore has been held securely against axial movements on the valve disk formed by the two parts 116 and 117 by the flaps or bent portions 111 and 112, FIG. 5, and bent in an opposite direction in relation to the area 19 from its center area 16 which flaps run in the annular groove 115 with their ends 113 and 114 bent in a manner pointing toward each other, the eye-like area 19 will hold the rocker valve 11 even in cases where the operational method have been disturbed in the area between the guide surfaces or tabs 119 and 120.

The dimensioning of the annular groove 115 has been chosen in relation to the thickness of the metal sheet material used for the manufacture of the holder 15 in such a way that the latter will permit relative revolutions between the valve on the one hand and the valve rocker 11 on the other hand.

The holder 15 can therefore be pushed prior to the entrance of the valve rocker 11 by movements in FIG. 5, from the rear to the front or, inversely, away from the valve spring retaining disk 116 and 117 or thereon. A third flap 118 has likewise been bent downwards in FIGS. 4 and 5, which is located between the two flaps 111 and 112 and which encloses a right angle therewith. This flap, however, in this structure given by way of example, is not bent with its end again in a horizontal direction but it merely serves as a safety mechanism to prevent undesired movements of the holder 15 in FIG. 4 in the direction toward the left. The eye-like area 19 which excludes movements toward the right of the valve rocker 11 after mounting in the direction, toward the right serves simultaneously and in the same manner, as a stop. If one takes into account furthermore that within the area of the edge of the recess 17 from the central area 16 of the holder 15 the two parallel guide surfaces 119 and 120, in the FIGS. 4 and 5, are bent in an upward direction, which guide surfaces guide the valve rocker 11 at both sides, then a positive locking safety mechanism against both lifting of the valve rocker 11 from the valve shaft 14 as well as against any kind type of lateral relative shifting between valve shaft 14, holder 15 and valve rocker 11, has been created by the arrangement described and according to the invention.

The valve spring has additionally been indicated at 121 in FIGS. 4 and 5.

FIG. 6, which shows the holder designated by 15 in FIG. 4, may be made of a single flat sheetmetal which has been cut in a certain manner. Further processing consists in simple bending steps whereby in each instance an angle of 90° is produced. The central area of the metal sheet 130, FIG. 6, contains the approximately arrow-shaped recess 131 which forms both the recess 17 in the finished holder 15 as well as a part of the eye-shaped area 19. This eye-like area is obtained by bending up the area 132 in FIG. 6. The result of this bending step as well as of the other bending methods is shown also in FIG. 7 in which the same reference numbers are used as in FIGS. 4 and 5.

The two continuations 133 and 134 at the edge of recess 131, are likewise bent upwards so as to form the guide surfaces 119 and 120 for the safety mechanism of the valve rocker 11 against lateral movements.

Finally, at the outside edge of the sheetmetal member 130, there are three more continuations 124, 125 and 126, each displaced by 90° in relation to one another. These three continuations are bent in the opposite direction from that of the continuations 133 and 134 and which later on form the flaps 111, 112 and 118, which serve for the connection of the holder 15 with the valve spring retaining disk 116 and 117.

We claim:

1. Safety mechanism for an individually fulcrummed rocking lever of a valve control, mounted at one end on a ball, especially for internal combustion engines, comprising, a valve shaft, a holder mounted on the upper end of said shaft in such a manner as to be secured against shifting movements in the axial direction of said shaft, said rocking lever having a projection element at its other end opposite said one end, said holder having an overlap portion adapted to snugly engage said rocking lever opposite end about its projection element, said holder further having a pair of guide tabs between which said rocking lever opposite end is snugly engaged, whereby a positive locking connection is provided between said valve and said rocking lever in both axial and lateral directions while at the same time permitting free rotation of said valve about its own axis.

2. Safety mechanism according to claim 1 wherein said holder is in the form of claw having an upper portion, sand said guide tabs define two lateral guide surfaces located in said upper portion.

3. Safety mechanism according to claim 1 wherein said holder has a lower portion containing receiving and guiding bores and further containing a slit-like recess communicating with said receiving bore.

4. Safety mechanism according to claim 1 wherein said shaft upper end is provided with an annular groove, and said holder has means for guiding it axially and radially with respect to said shaft upper end.

5. Safety mechanism according to claim 1 wherein said holder is of spring sheet metal.

6. Safety mechanism according to claim 1 wherein said holder comprises an elastic integral molded part having an axial bore therein and having at least one arch-shaped bead projecting into said bore.

7. Safety mechanism according to claim 1 wherein said holder comprises a nonelastic solid molded part, and a separate element being provided to cooperate with said part to mount it on said shaft upper end.

8. Safety mechanism according to claim 5 wherein said flap upper end is provided with an annular groove, said overlap portion of said holder is defined by an eye-like area thereof, said guide tabs being defined by bent-up portions from the plane of said holder, said tabs each lying in a plane parallel to the axis of said shaft, said holder also having three outwardly directed flaps thereon disposed 90° apart, the middle one of said flaps being disposed diametrically opposite said eye-like area, each of said flaps being downwardly bent from the plane of said holder, the remaining ones of said flaps being further bent inwardly toward one another to thereby engage said shaft annular groove, and said middle flap and said eye-like area forming stops to prevent any lateral movement of said remaining flaps with respect to said annular groove.

9. Safety mechanism for an individually fulcrummed rocking lever of a valve control, mounted at one end on a ball, especially for internal combustion engines, comprising, a valve shaft, a sheet metal holder mounted on the upper end of said shaft, a constructional element disposed below said holder on said shaft one upper end, said element being secured to said shaft against shifting in an axial direction thereof, said holder having a pair of guide tabs thereon defined by bent-up portions between which said rocking lever is snugly engaged, and said constructional element being in the form of a valve spring retaining disk having an annular groove therein with which said holder cooperates, thereby establishing a positive locking connection in an axial and lateral direction between said shaft and said rocking lever.

10. Safety mechanism according to claim 9 wherein said valve spring retaining disk consists of two axially connected parts between which said annular groove is located.

* * * * *